Figure 1:
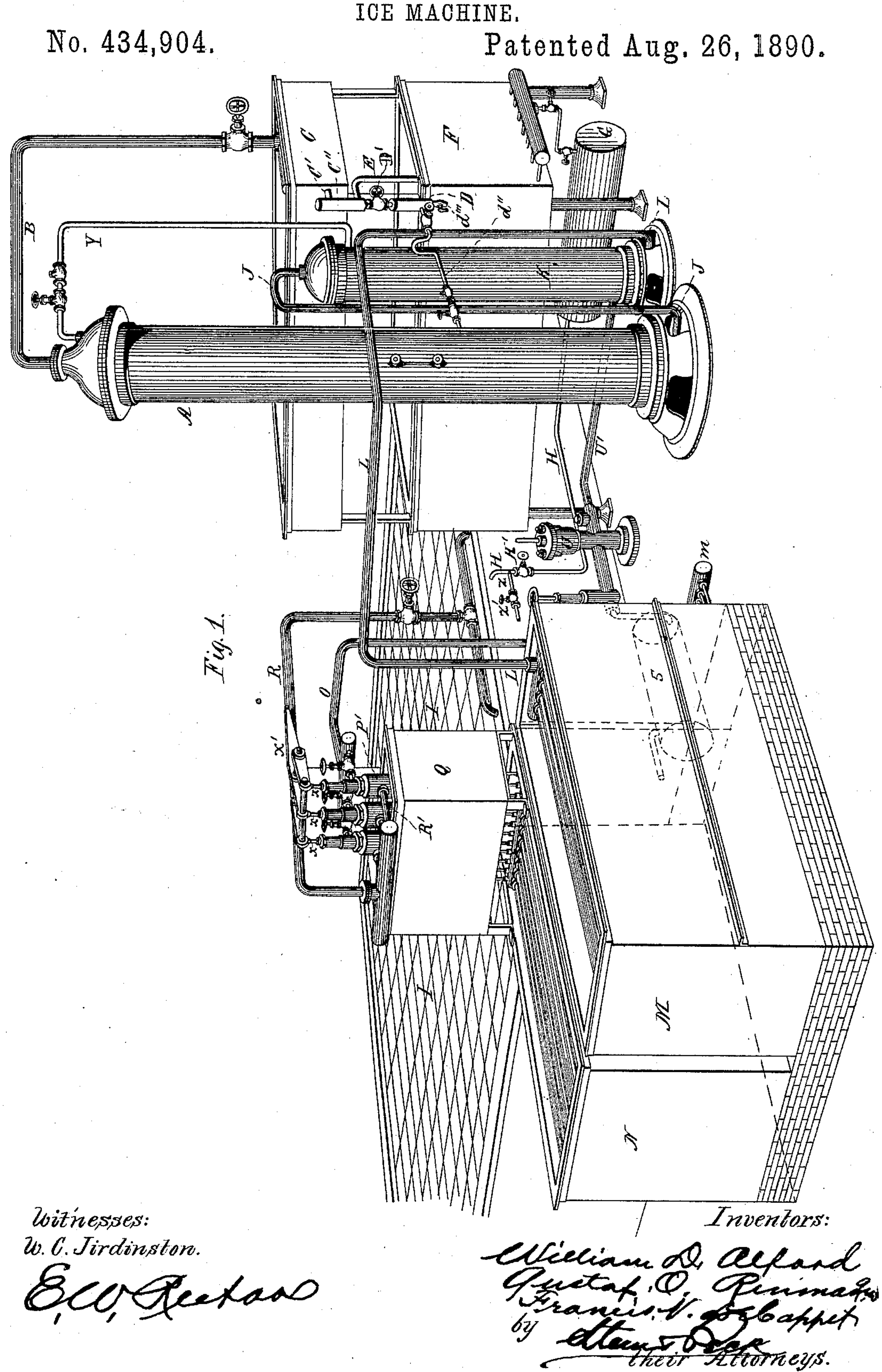

(No Model.) 4 Sheets—Sheet 1.

W. D. ALFORD, G. O. RINMAN & F. V. DE COPPET.

ICE MACHINE.

No. 434,904. Patented Aug. 26, 1890.

Witnesses:
W. C. Jirdinston.
E. W. Keeton

Inventors:
William D. Alford
Gustaf O. Rinman
Francis V. DeCoppet
by [illegible]
their Attorneys.

THE NORRIS PETERS CO., PHOTO-LITHO., WASHINGTON, D. C.

(No Model.)

4 Sheets—Sheet 2.

W. D. ALFORD, G. O. RINMAN & F. V. DE COPPET.

ICE MACHINE.

No. 434,904. Patented Aug. 26, 1890.

Witnesses:
W. C. Jirdinston.
E. W. Rector

Inventors:
William D. Alford,
Gustaf O. Rinman, and
Francis V. De Coppet
by Stem & Peck
their Attorneys.

THE NORRIS PETERS CO., PHOTO-LITHO., WASHINGTON, D. C.

(No Model.)

4 Sheets—Sheet 3.

W. D. ALFORD, G. O. RINMAN & F. V. DE COPPET.

ICE MACHINE.

No. 434,904. Patented Aug. 26, 1890.

Witnesses:
W. C. Jirdinston.
E. W. Reeford

Inventors:
William D. Alford,
Gustaf O. Rinman, &
Francis V. De Coppet
by Stewart Peck
their Attorneys.

THE NORRIS PETERS CO., PHOTO-LITHO., WASHINGTON, D. C.

(No Model.) 4 Sheets—Sheet 4.

W. D. ALFORD, G. O. RINMAN & F. V. DE COPPET.

ICE MACHINE.

No. 434,904. Patented Aug. 26, 1890.

Witnesses:
W. C. Jirdinston:
E. C. Reeton

Inventors:
William D. Alford
Gustaf O. Rinman, and
Francis V. De Coppet
by Stem & Peck
their Attorneys.

THE NORRIS PETERS CO., PHOTO-LITHO., WASHINGTON, D. C.

UNITED STATES PATENT OFFICE.

WILLIAM D. ALFORD, GUSTAF O. RINMAN, AND FRANCIS V. DE COPPET, OF CINCINNATI, OHIO, ASSIGNORS TO THE CINCINNATI ICE MACHINE COMPANY, OF SAME PLACE.

ICE-MACHINE.

SPECIFICATION forming part of Letters Patent No. 434,904, dated August 26, 1890.

Application filed January 20, 1886. Serial No. 189,180. (No model.)

*To all whom it may concern:*

Be it known that we, WILLIAM D. ALFORD, GUSTAF O. RINMAN, and FRANCIS V. DE COPPET, citizens of the United States, residing at Cincinnati, in the county of Hamilton and State of Ohio, have invented certain new and useful Improvements in Ice or Refrigerating Machines, of which the following is a full, clear, and exact description, reference being had to the accompanying drawings, forming a part of this specification.

Our invention relates to ice or refrigerating machines of that class usually known as "absorption-machines"—that is, machines in which cold is produced by the absorption of heat by the rapid expansion of volatile gas, such as ammonia-gas, and in which the spent gas is absorbed in the weak liquor, thus reconstituting the strong ammonia. The ammonia-gas, preferably used, is produced by the evaporation by heat of a solution of ammonia and water, the water being used as a vehicle for again collecting the gas and conveying it to the retort or generator. In this class of machines two difficulties are encountered: first, the gas generated by the application of heat to aqua-ammonia often, especially when the aqua-ammonia is not rich in gas, carries with it more or less steam or watery vapor, which freezes in the pipes and clogs the machine; second, as the capacity of water to absorb ammonia varies with the temperature of the water, this capacity decreases as the temperature increases. When the water used for cooling the machine and its contents is above 65° or 70° Fahrenheit, the water will not absorb by the usual process sufficient ammonia-gas to make the machine as effective as it is desired it should be.

Our invention will first be described in connection with the accompanying drawings, and then pointed out in the claims.

Figure 2:
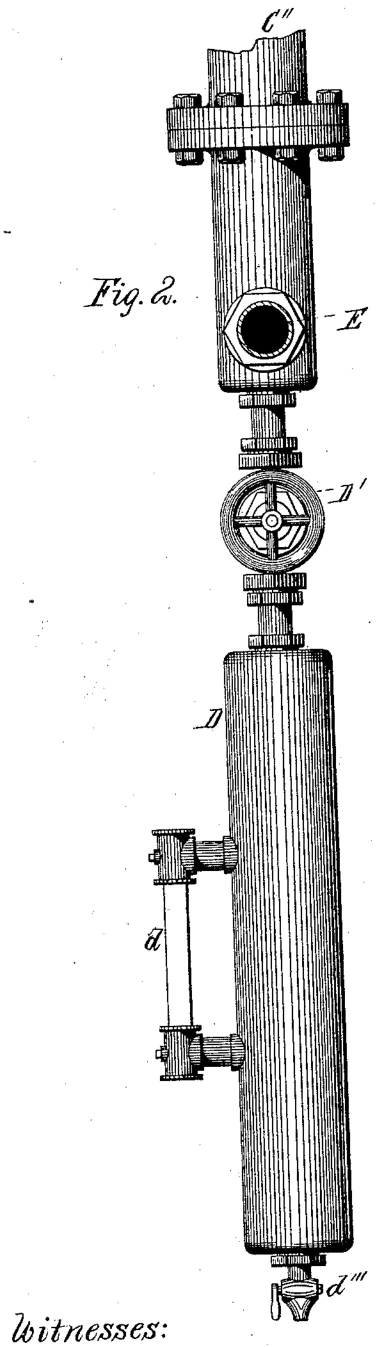
Figure 3:
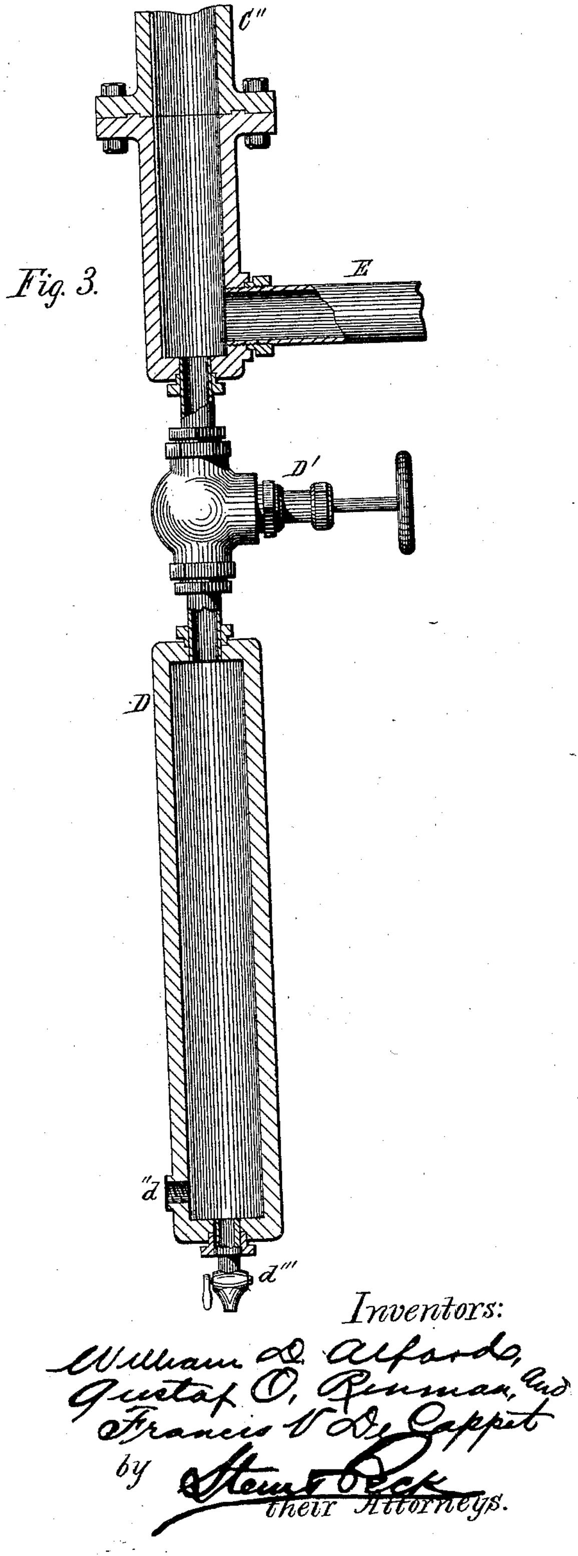
Figure 4:
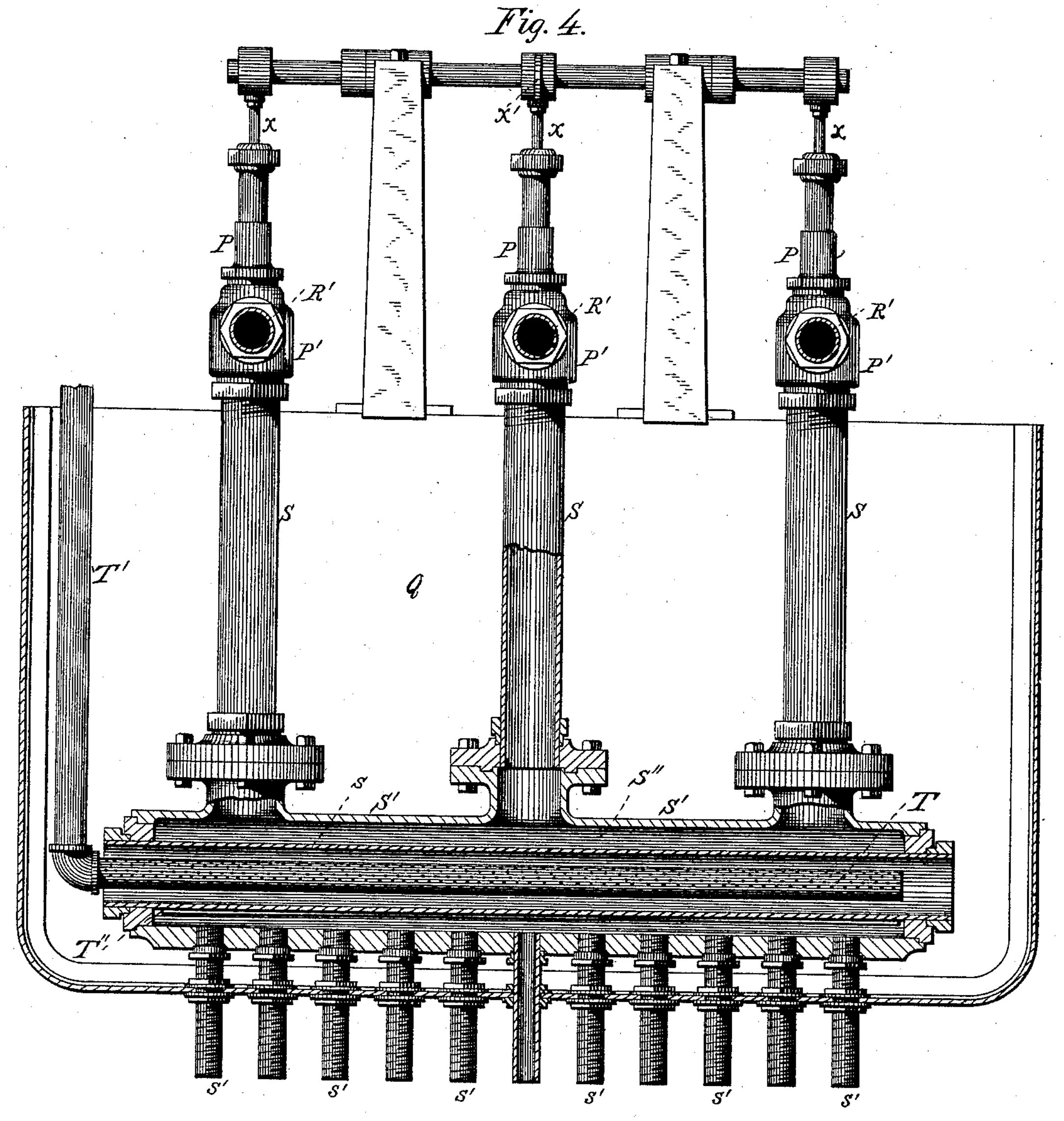
Figure 5:
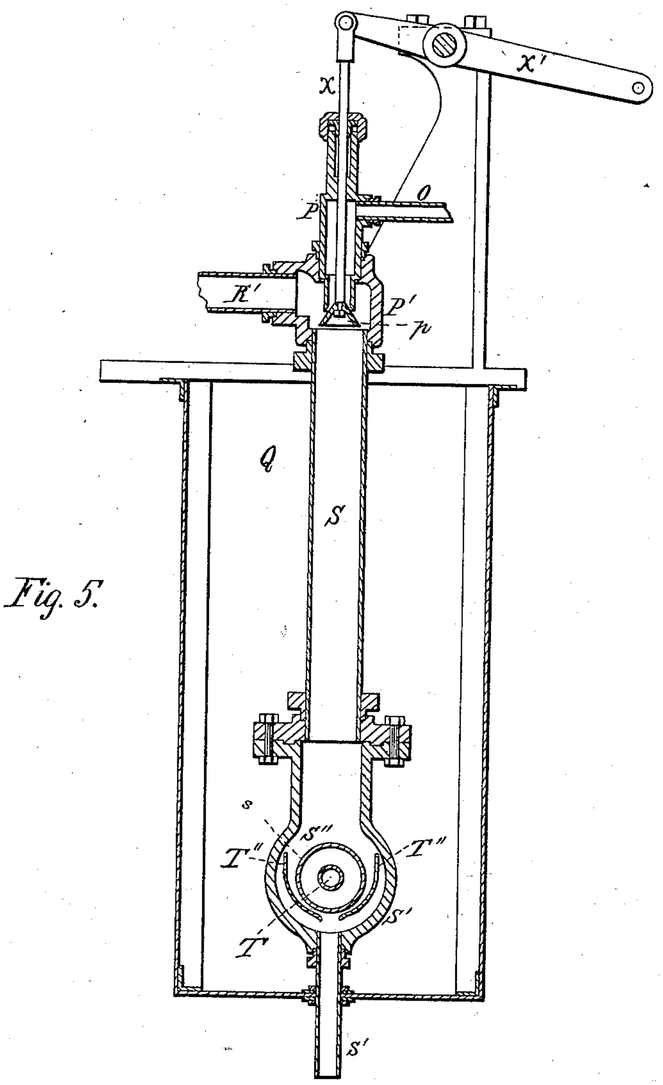

In the accompanying drawings, Figure 1 is a perspective view of an absorption ice-machine on which our improvements are applied. Fig. 2 is a front elevation of the trap and connecting-pipes. Fig. 3 is a side elevation of the trap, partly in section. Fig. 4 is a front elevation of the absorbers and mixers partly in section. Fig. 5 is a side elevation of the same in section.

The same letters of reference are used to indicate identical parts in all the figures.

In Fig. 1, A represents a retort or generator. This retort is partly filled with aqua-ammonia, and heat is applied, preferably by an internal coil of steam-pipes. At the upper end of the retort is a pipe B for conveying the gas generated in the retort to the condenser. From the pipe B the gas is forced by the pressure into a cooler or condenser C, which may be termed the "steam-condenser." It consists of a tank of cooling-water, through which is passed a coil of pipe carrying the gas. In this condenser C the contents of the pipes are cooled sufficiently to precipitate or condense any steam or watery vapors which may have escaped from the retort with the gas, but not enough to condense the gas itself, which condenses at a considerably lower temperature than steam. The gas and condensed vapor or water pass from the condenser C through the exit-pipe C′ into the vertical pipe C″.

To the lower end of the pipe C″ is attached a trap D, consisting of a hollow cylinder or any conveniently-shaped vessel provided with a cock D′ for opening or closing its connection with the pipe C″. Leading from the pipe C″, just above the trap D, is the pipe E, at an angle, so that the gas passes freely into the pipe E, while the water or condensed vapor drops by gravity into the trap D. When the aqua-ammonia is very rich, the volatile ammonia or gas is thrown off in sufficient quantity at a low temperature in the retort A, so low that no watery vapor passes, and the trap becomes useless. In that case the cock D′ is closed.

*d* is a glass gage on the side of the trap to indicate the quantity of liquor in the trap.

*d″* is a pipe or tube by which the contents of the trap, which of course consist, mainly, of a solution of aqua-ammonia, are conveyed back to the retort A.

*d‴* is a cock, which may be opened to drain or expurge the trap D.

The gas in the pipe E passes on to the second or gas condenser F, Fig. 1, where it is condensed by cold and pressure to a liquid form or anhydrous liquid ammonia, which is stored in the strong drum G below the condenser. The pipe H connects the drum G with the refrigerating-tank I. By opening the cock H′ the gas is forced by the pressure in the drum through the pipes in the refrigerator I, rapidly expanding and absorbing heat.

In order to recombine the expanded gas and water or impoverished liquor for the purpose of conveying the gas back to the retort to be again used, the improved mixer and absorber are used. Various forms of absorbers have been used for this purpose, all of which, however, have been inefficient, because the water or liquor could not be made to carry to the retort at all times sufficient gas to operate the machine and supply the refrigerator. This was owing, first, to the fact that they relied upon the natural affinity of water for ammonia alone to make the solution strong enough; second, because they failed to expose a sufficient surface of water to the gas under proper conditions to enable it to absorb all the gas it is capable of absorbing. The natural affinity of water for ammonia varies with the temperature, diminishing rapidly as the temperature of the water increases. While water at 60° Fahrenheit will absorb over six hundred volumes of gas, at 70° it will absorb only about five hundred and sixty volumes, and at 90° still less, about four hundred volumes. The impoverished liquor from the retort is, of course, hot; but it is cooled by being subjected to the action of cooling-water before it is exposed to the ammonia. When the expanded gas and cooled liquor are brought together, the process of absorption produces heat. This heat raises the temperature of the solution and decreases the absorbent power of the liquor. It is therefore necessary in order to produce a solution sufficiently rich in ammonia to cool the ammonia and the liquor and keep it cool. This is done by applying cold water from the outside. Where this cooling-water is itself warm, as happens in hot weather or hot climates, the liquor cannot be cooled enough to make it absorb a sufficient quantity of gas to render the solution rich enough to do its work effectively; hence in hot climates or hot weather absorption-machines as heretofore constructed have become ineffective.

Mr. Alford discovered that water could be made to carry as a vehicle a quantity of volatile ammonia in addition to the quantity absorbed and carried in solution, and also that by keeping the solution continually cool and dividing it into smaller volumes or streams a part of this free gas could be absorbed. His process of combining ammonia and water or the impoverished liquor has been made the subject of a separate application for Letters Patent, filed October 19, 1885. The mechanical device or mechanism by which the combination is made is our joint invention, and is described below.

Connected with the lower end of the retort A is a pipe J. The pressure in the retort forces the liquor through the pipe J to the exchanger K. This exchanger consists of a cylindrical vessel having an ordinary coil of pipe passing through the center of it. The pipes J and L connect with the coil in the exchanger, so that they and the coiled pipe in the exchanger are virtually one pipe or a continuous duct, through which the liquor is forced from the retort to the cooler M, where it passes through a coil of pipe surrounded by cooling-water for the purpose of reducing its temperature as much as possible to increase its capacity to absorb gas. From this cooler M it passes either through the manifold *m* or directly into the pipe O, which conveys it thus cooled to the mixer. In the drawings three of these mixers are shown. Any convenient number may be used. They are shown in detail in Figs. 4 and 5.

P is a cylinder or chamber into which the liquor is conveyed by the pipe O. Through this cylinder passes a valve-rod $x$, operated by the lever $x'$. To the lower end of the rod $x$ is attached a conical valve $p$, seated against the lower end of the cylinder P. The levers may be altogether omitted and the valve or deflector simply suspended at any convenient distance to distribute the liquor to the best advantage. When the valve is opened by moving the valve-rod down, the water or poor liquor coming through the pipe O flows from the chamber P over the conical valve in a circular sheet somewhat in the form of an umbrella. By this arrangement a large surface of the liquor is exposed.

Around the valve or immediately above it is a circular chamber P′, into which ammonia-gas is introduced from the refrigerator through the pipe R′. The natural affinity of ammonia-gas and water will of itself produce a suction through the pipe R′ toward the stream of water, the water absorbing a large quantity of gas, according to its temperature. If the temperature of the water is sufficiently low to enable it to absorb gas enough to operate the machine effectively, no pressure need be applied to the gas. Where, however, the water or poor liquor is warm—say much above 65° Fahrenheit—it is desirable to force more gas into the liquor than it can absorb and carry in solution. This is done by applying pressure to the gas in the pipe R′. This may be done in various ways, that preferred being to open the valve H′, admitting the gas to the refrigerator, thus producing a back-pressure on the expanded gas in the refrigerator-coils. This pressure forces gas through the pipes R and R′ and into the water flowing through the mixer more rapidly and in greater quantity than it can be absorbed by the liquor. This unabsorbed gas is carried down by the pressure and by the flow of the water by what may be termed "mechanical induction" through the pipe S. This pipe is surrounded with cooling-water in the tank Q and its lower end opens into a manifold S′. The gas which is absorbed by the water throws off the heat, which in expanding it has absorbed in the refrigerator, together with the heat developed by the chemical combination. This heat raises the temperature of the solution and decreases its capacity to absorb or hold in solution the gas. To take up this heat and keep the solution cool is the purpose of the water-tank Q.

Within the manifold S′ is a wall or inner pipe S, forming an external and internal chamber within the manifold. The liquor flows in this external chamber S″, around the wall or pipe S, and out through the small pipes *s′ s′ s′*. Inside of the pipe S is a smaller perforated pipe T. Cooling-water introduced in the pipe T is jetted through the perforations against the inside of the pipe S to further cool the solution on the outside of the pipe S.

Within the manifold and around the pipe S is a sheet-iron deflector T″ to cause the liquor flowing down through the pipe S to be deflected against the cold surface of the pipe *s* to more effectually cool it. From the manifold S′ the enriched liquor passes, carrying a large quantity of free or unabsorbed gas through a large number of small pipes *s′ s′ s′*, which are kept cool by being coiled through a water-tank N. From the cooling-tank N the enriched liquor, consisting of the solution of water and ammonia or aqua-ammonia and free gas, passes to a vase or reservoir 5, (shown in dotted lines, Fig. 1,) and whose construction is not important, except that it be strong and tight. If the contents of this reservoir are tested, they will be found to show a density much greater than a mere solution of aqua-ammonia at the same temperature. For instance, the density of aqua-ammonia at 60° Fahrenheit is about 26° Baumé. If the contents of the reservoir are at 60° and are drawn off and tested immediately, they will often show a density of 29° or 30°, or even higher; but if exposed to the atmosphere—that is, without pressure—they will rapidly lose several degrees and drop down to 26° by reason of the escape of the gas which has not been held in chemical solution, but has simply been conveyed to the reservoir mechanically by the water. From this reservoir the rich liquor and gas are pumped to the retort as needed by the pump U, only partly shown. This pump forces the rich liquor through the pipe U′ into the lower end of the exchanger K, where it surrounds the coil of pipe which conveys the hot poor liquor from the retort to the cooler M. From the exchanger it is forced on up through the pipe Y into the top of the retort. There is therefore in the exchanger the hot poor liquor passing down through the internal coil of pipe, and the cool rich liquor passing up, as described, and their temperatures are partially exchanged.

When the aqua-ammonia used in the machine is not sufficiently rich in gas to operate the machine with the best results, it may be re-enforced by introducing anhydrous ammonia. For instance, if a drum of anhydrous ammonia be attached to the pipe Z and the cock Z′ be opened, the pressure in the drum forces gas through the refrigerator-pipes, where it does its work, and then passes through the pipe R into the mixer, where it is absorbed or carried by the liquor in the manner described to the reservoir, thus re-enforcing the aqua-ammonia in the machine and increasing its power. This subdivision of the volume of liquor through a large number of cooling-pipes causes a more thorough mixture of the gas and water, and the continued application of the cooling-water takes up the heat thrown off by the gas absorbed, keeping down the temperature, so that by the time the liquor reaches the reservoir it has absorbed all the gas it is capable of absorbing at that temperature. In addition to that it has carried with it mechanically and by reason of the pressure a large quantity of free gas. By this manner of mixing the gas and poor liquor the liquor is made to absorb all the gas it can possibly take up in solution, and is forced to carry as a vehicle, no matter what its temperature, a quantity of free gas over and above the amount it could absorb and carry in solution, so that where the cooling-water is too warm to reduce the temperature of the liquor to a point where it could absorb sufficient gas to operate the machine effectively this additional quantity of free gas carried by the liquor mechanically, regardless of temperature, and pumped from the vase to the retort, will be sufficient to cause the machine to work perfectly effectively at any temperature of cooling-water, and where the aqua-ammonia of commerce supplied to the retort is not rich enough anhydrous ammonia may be introduced and the same amount of water forced to carry it to operate the machine in the manner described.

Having thus fully described our invention, we claim—

1. In an ice-machine, the combination, with the retort, an aqueous-vapor condenser, suitable pipe-connection between the retort and said condenser, and an ammonia-vapor condenser, of an exit-pipe leading from the aqueous-vapor condenser, a vertical pipe in communication with the exit-pipe, a bent pipe in communication with the vertical pipe and leading into the ammonia-vapor condenser, a trap provided with a cock D′, secured to the lower end of the vertical pipe, and a pipe leading from the trap to the retort, all substantially as described.

2. In an ice-machine, a mixer consisting of cylinder P, having an inlet O for the liquor at its upper end and a deflector *p* at its lower end, and a chamber P′, surrounding the lower end of said cylinder and having an inlet R′ for the gas leading into said chamber above the deflector, substantially as described, and for the purposes set forth.

3. In an ice-machine, the combination, with the cylinder P, having an inlet O for the liquor at or near its upper end, of a rod passing through said cylinder and provided with a deflector-valve at its lower end adapted to seat against the lower end of the cylinder, means for operating said rod, a chambered casting surrounding the lower portion of cylinder P, and an inlet R′ for the gas leading into the chamber in said casting above the deflector-valve, for the purposes stated.

4. In an ice-machine, a manifold having an inner tubular wall, a deflector outside of said wall, and a perforated pipe within said wall, whereby the liquid entering the manifold is deflected onto the outer side of the tubular wall and the cooling-water is thrown against the inner side, substantially as described.

WILLIAM D. ALFORD.
GUSTAF O. RINMAN.
FRANCIS V. DE COPPET.

Witnesses:
J. B. DODDS,
E. W. RECTOR.